(12) United States Patent
Baker et al.

(10) Patent No.: US 11,706,175 B2
(45) Date of Patent: *Jul. 18, 2023

(54) ELECTRONIC MAIL DELIVERY NEGOTIATION AND REJECTION USING SENDER SPECIFIED ACCEPTANCE CRITERIA VALUES

(71) Applicant: International Business Machines Corporation, Armonk, NY (US)

(72) Inventors: Ronald B. Baker, Wake Forest, NC (US); Tara L. Sims, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/335,072

(22) Filed: Oct. 26, 2016

(65) Prior Publication Data

US 2017/0048175 A1 Feb. 16, 2017

Related U.S. Application Data

(63) Continuation of application No. 13/890,663, filed on May 9, 2013, now Pat. No. 9,491,129.

(51) Int. Cl.
```
G06F 15/16      (2006.01)
H04L 51/212     (2022.01)
H04L 51/02      (2022.01)
```
(52) U.S. Cl.
CPC ............ *H04L 51/212* (2022.05); *H04L 51/02* (2013.01)

(58) Field of Classification Search
CPC .............................. H04L 51/12; G06Q 10/107
(Continued)

(56) References Cited

U.S. PATENT DOCUMENTS 7,945,954 B2    5/2011  Coueignoux
9,306,887 B1 *  4/2016  Brunetti .................. H04L 51/12
(Continued)

OTHER PUBLICATIONS

Xia, Y. et al., "Email Categorization with Tournament Methods," [online] in Natural Language Processing and Information Systems, pp. 150-160. Springer Berlin Heidelberg, 2005, retrieved from the Internet: <http://staffwww.dcs.shef.ac.uk/people/W.Liu/papers/NLDB05_correction.pdf>, 12 pgs.

(Continued)

*Primary Examiner* — Hee Soo Kim
(74) *Attorney, Agent, or Firm* — Cuenot, Forsythe & Kim, LLC (57) ABSTRACT

Processing electronic mail can include receiving, within an electronic mail server, an electronic mail from a sender client system, sending acceptance criteria for a recipient of the electronic mail to the sender client system responsive to receiving the electronic mail, and receiving, within the electronic mail server, acceptance criteria values from the sender client system in response to the acceptance criteria for the recipient. Using a processor of the electronic mail server, a determination is made whether the acceptance criteria values comply with the acceptance criteria. Responsive to determining that the acceptance criteria values are non-compliant with the acceptance criteria, the electronic mail server rejects the electronic mail, wherein the electronic mail is not delivered to the recipient, and providing, to the sender client system, an indication of rejection of the electronic mail including a reason for non-compliance.

20 Claims, 5 Drawing Sheets

(58) Field of Classification Search
USPC .......................................................... 709/206
See application file for complete search history.

(56) References Cited

U.S. PATENT DOCUMENTS

| | | | |
|---|---|---|---|
| 9,491,129 B2 | 11/2016 | Baker et al. | |
| 2006/0053279 A1* | 3/2006 | Coueignoux | H04L 51/12 713/154 |
| 2006/0253597 A1* | 11/2006 | Mujica | G06Q 10/107 709/229 |
| 2008/0250106 A1* | 10/2008 | Rugg | G06Q 10/107 709/206 |
| 2009/0150489 A1* | 6/2009 | Davis | G06Q 10/107 709/204 |
| 2011/0302311 A1 | 12/2011 | Gross et al. | |
| 2012/0215852 A1* | 8/2012 | Chen | H04L 51/212 709/206 |
| 2014/0337439 A1 | 11/2014 | Baker et al. | |

OTHER PUBLICATIONS

"Email classification in MS Outlook / MEMOS Software," [online] MEMOS Software s.r.o. © 2003-2013, [retrieved Apr. 16, 2013] retrieved from the Internet: <www.memos.cz/en/case-study/email-classification-in-ms-outlook/>,3 pgs.
Aery, M. et al., "emailsift: Adapting graph mining techniques for email classification," [online] Technical Report CSE-2004-7, Department of Computer Science and Engineering, University of Texas at Arlington, Jul. 2004, retrieved from the Internet: <http://www.cse.uta.edu/research/publications/Downloads/CSE-2004-7.pdf>, 24 pgs.
Mock, K., "An Experimental Framework for Email Categorization and Management," [online] in Proc. of the 24th Int'l. ACM SIGIR Conf. on Research and Development in Information Retrieval, pp. 392-393. ACM, 2001, retrieved from the Internet: <http://www.math.uaa.alaska.edu/~afkjm/papers/emailcat.pdf>, 3 pgs.
Greenberg, E.P. et al., "Enforcing Bulk Mail Classification" [online] arXiv preprint cs/0501027, May 19, 2005, retrieved from the Internet: <http://arxiv.org/pdf/cs.NI/0501027>, 6 pgs.
"Send Classifications," [online] ExactTarget, [retrieved Apr. 16, 2013] retrieved from the Internet: <http://help.exacttarget.com/en/documentation/exacttarget/admin/send_classifications/>, 9 pgs.
"The Email Overload Solution: Taglocity Boosts Productivity," [online] Terazen Technology, Inc. © 2010 [retrieved Apr. 16, 2013] retrieved from the Internet: <www.taglocity.com/emailOverload.html>, 2 pgs.
Lopez, E., "Usability Forum—A Brighter Outlook: Part I—Email Tagging," [online] MyOpera.Com, Apr. 28, 2006 [retrieved Apr. 16, 2013] retrieved from the Internet: <http://my.opera.com/usability/blog/show.dml/237595>, 16 pgs.
Whittaker, S. et al., "Email Overload: Exploring Personal Information Management of Email," in Proc. of SIGCHI Conf. on Human Factors in Computing Systems: Common Ground, pp. 276-283, ACM, 1996.
U.S. Appl. No. 13/890,663, Non-final Office Action, dated Dec. 31, 2015, 9 pg.
U.S. Appl. No. 13/890,663, Notice of Allowance, dated Jul. 13, 2016, 7 pg.

* cited by examiner

Requests for Information (605)

Requests for Information From Others (610)

| Sender | Desired Response | Severity |
|---|---|---|
| User 1 | 05/01/2013 12:00 PM | Critical |
| User 2 | 06/21/2013 05:00 PM | Important |

Replies to My Requests for Information (615)

| Sender | Desired Response | Severity |
|---|---|---|
| User 3 | 05/02/2013 11:00 AM | Critical |
| User 4 | 06/22/2013 05:00 PM | Important |

Calendar (635)

Hierarchical Folder View (640)

Assignments (620)

| Category | Assignment | Sender | Due Date | Priority |
|---|---|---|---|---|
| Project A | Complete programming Guide | User 5 | 05/01/2013 | High |
| Meetings | Setup meeting with team leader | User 6 | 06/21/2013 | Medium |

Returned Mail (625)

| Recipient | Date Sent | Category | Subject | Reason for Return |
|---|---|---|---|---|
| User 7 | 04/17/2013 11:13 AM | Request for information | 2013 Budget | Out of the Office |
| User 8 | 04/16/2013 10:31 AM | Uncategorized | Project B | Recipient requires categorization |

For Your Information (630)

| Recipient | Date Sent | Subject |
|---|---|---|
| User 7 | 04/17/2013 11:13 AM | 2013 Budget |
| User 8 | 04/16/2013 10:31 AM | Project C |

# ELECTRONIC MAIL DELIVERY NEGOTIATION AND REJECTION USING SENDER SPECIFIED ACCEPTANCE CRITERIA VALUES

BACKGROUND

The use of electronic mail (email) has led to significant gains in productivity. As the amount of email traffic continues to increase, however, email can become a drag on productivity. This is particularly true in large organizations with multiple locations. Users often receive a significant number of emails each day that are of either little or no relevance to the user. The more time the user spends managing these emails, the less time that is available for doing actual work.

Efforts to reduce the number of emails a user receives have largely focused on unwanted emails referred to as "junk email" or "spam" (hereafter collectively "junk email"). Junk email typically is identified by the email service provider or the user's email client. Emails are processed using techniques such as content analysis, source filtering, or the like to label an email as "junk." The junk email then can be deleted or delivered to a particular email folder, for example.

Still, the amount of "legitimate" emails, i.e., emails not considered "junk email," received by users can be overwhelming and significantly reduce productivity.

BRIEF SUMMARY

An embodiment can include a method of processing electronic mail (email). The method can include receiving, within an email server, an email from a sender client system, sending acceptance criteria for a recipient of the email to the sender client system, and receiving, within the email server, acceptance criteria values from the sender client system in response to the acceptance criteria for the recipient. The method further includes determining, using a processor of the email server, whether the acceptance criteria values comply with the acceptance criteria. Responsive to determining that the acceptance criteria values are non-compliant with the acceptance criteria, the email is rejected by the email server, wherein the email is not delivered to the recipient, and an indication of rejection of the email including a reason for non-compliance is provided to the sender client system.

Another embodiment can include a system having a processor. The processor is programmed to initiate executable operations. The executable operations include receiving, within an email server, an email from a sender client system, sending acceptance criteria for a recipient of the email to the sender client system, and receiving, within the email server, acceptance criteria values from the sender client system in response to the acceptance criteria for the recipient. The executable operations further include determining whether the acceptance criteria values comply with the acceptance criteria. Responsive to determining that the acceptance criteria values are non-compliant with the acceptance criteria, the email is rejected by the email server, wherein the email is not delivered to the recipient, and an indication of rejection of the email including a reason for non-compliance is provided to the sender client system.

Another embodiment can include a computer program product for processing email. The computer program product can include a computer-readable storage medium having stored thereon program code that, when executed, configures a processor to perform a method. The method can include receiving, by an email server, an email from a sender client system, sending, by the email server, acceptance criteria for a recipient of the email to the sender client system, and receiving, by the email server, acceptance criteria values from the sender client system in response to the acceptance criteria for the recipient. The method further includes determining, using a processor of the email server, whether the acceptance criteria values comply with the acceptance criteria. Responsive to determining that the acceptance criteria values are non-compliant with the acceptance criteria, the email is rejected by the email server, wherein the email is not delivered to the recipient, and an indication of rejection of the email including a reason for non-compliance is provided to the sender client system.

BRIEF DESCRIPTION OF THE SEVERAL VIEWS OF THE DRAWINGS

FIG. 6 is a block diagram illustrating an exemplary user interface displayed by a client system of a user.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The phrase "computer-readable storage medium" means a non-transitory storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

This specification relates to electronic mail (email) and, more particularly, to negotiated delivery of email and rejection of email. In accordance with the inventive arrangements disclosed within this specification, email is delivered to a user only under certain enumerated conditions. A user is able to specify acceptance criteria defining one or more conditions to be met for an email to be delivered to the user. A user sending the email is able to specify values, referred to as acceptance criteria values, for the various items of acceptance criteria specified by the user designated as the recipient of the email. An email server performs a negotiation that compares the acceptance criteria defined by the recipient with the acceptance criteria values provided by the sender. Through the negotiation, the email server determines whether to send the email on to the recipient, e.g., deliver the email to the recipient, or reject the email. Other aspects relating to email processing are described below in greater detail with reference to the figures.

Figure 1:
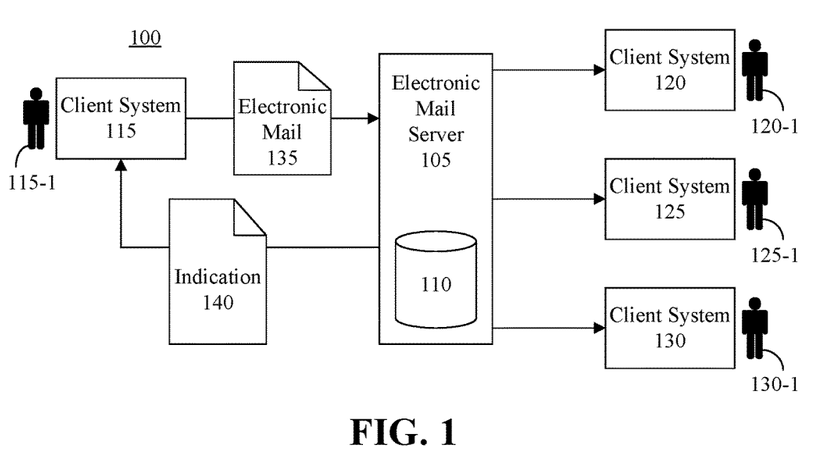
FIG. 1 is a block diagram illustrating an exemplary electronic mail (email) system.

FIG. 1 is a block diagram illustrating an exemplary email system 100. Email system 100 includes an email server 105 including a data storage unit 110. Email server 105 is communicatively linked with a plurality of client systems such as client systems 115, 120, 125, and 130. Email server 105 is implemented as a data processing system. Each of client systems 115-130 also is implemented as a data processing system including, for example, a communication and/or mobile device. Email server 105 communicates with client systems 115-130 over a network (not shown). The network can be implemented as, or include, any of a variety of different networks such as a WAN, a LAN, a wireless network, a mobile network, a Virtual Private Network (VPN), the Internet, the Public Switched Telephone Network (PSTN), or the like.

In the example pictured in FIG. 1, each of client systems 115-130 can be operated by a user. The term "user" means a human being that is operating and/or accessing a particular client system. User 115-1 is the user of client system 115. User 120-1 is the user of client system 120. User 125-1 is the user of client system 125. User 130-1 is the user of client system 130. Each of client systems 115-130 can be said to be "associated" with the particular user that is operating the client system. For example, each of client systems 115-130 can execute an email program that operates cooperatively with email server 105 so that the user of the client system is able to send and/or receive email as the case may be.

For purposes of illustration, user 115-1 is a sender since user 115-1 sends email 135 through client system 115 in cooperation with email server 105. As such, client system 115 can be referred to as a "sender client system." Each of users 120-1, 125-1, and 130-1 is a recipient, or a potential recipient, in that each, through his or her respective client system in cooperation with email server 105, can receive one or more emails such as email 135. Accordingly, each of client systems 120-130 can be referred to as a "recipient client system."

Within this specification, a reference to a particular user may also refer to the client system associated with that user. Similarly, a reference to a particular client system may also refer to the user associated with that client system. For example, when user 115-1 sends an email to user 120-1, it is understood that the email is sent from client system 115 to client system 120 by way email server 105.

Email server 105 receives emails from one or more client systems for delivery to one or more other client systems. In one aspect, data storage device 110 includes, or stores, acceptance criteria for one or more users. For example, data storage device 110 stores acceptance criteria, e.g., a profile, for each of users 120-1, 125-1, and 130-1. While data storage device 110 is illustrated as being a part of email server 105, it should be appreciated that data storage device 110 can be implemented as another data processing system or as a standalone data storage device that is communicatively linked with email server 105.

Further, while pictured as a single data processing system, email server 105 can be implemented as two or more data processing systems communicatively linked with one another. For example, a first data processing system can perform conventional email functions, while a second data processing system in communication with the first data processing system can be tasked with one or more operations relating to negotiated delivery of email as described in further detail within this specification. As another example, email server 105 can represent a plurality of email servers that are daisy chained together with the acceptance criteria being replicated across each of the plurality of email servers. It should be appreciated that any of a variety of different email server configurations can be used to implement the various embodiments disclosed within this specification.

In operation, client system 115 sends email 135 to user 120-1. Email server 105, responsive to receipt of email 135, identifies user 120-1 as the recipient of email 135. Accordingly, email server 105 selects the acceptance criteria of user 120-1 from data storage device 110, and sends the acceptance criteria to client system 115. In another aspect, prior to sending email 135, client system 115 identifies each recipient of email 135 and queries email server 105 for the acceptance criteria for each recipient of email 135.

The acceptance criteria for a user define the conditions that must be met in order for email to be delivered to that user. The acceptance criteria include one or more items of acceptance criteria. Within the acceptance criteria, items can be designated as mandatory or not. Further, for each item of acceptance criteria, a particular acceptance criteria value, or range of values, can be specified as required. Exemplary items of acceptance criteria that can be specified for each user include, but are not limited to, a requested response date, an urgency level, a category indicating subject matter of the email, and message type. Message type indicates the action that is to be performed in response to the email. Exemplary message types include, but are not limited to, for your information (FYI), request for information, automated form processing, calendar invite, work assignment, etc. An FYI email does not require any action and is informative in nature. A request for information requires a response. An automated form, for example, would require approval or disapproval, e.g., approving a vacation request, but is considered more "pro forma" than a request for information.

As noted, for each item of acceptance criteria for a given user, the user can indicate whether a value must be specified in order for the email to be delivered. Such items of acceptance criteria are considered mandatory. Thus, an email that is sent to the user that lacks an acceptance criterion value for a mandatory acceptance criterion is not delivered to the user, e.g., is rejected. In another example, the user can specify an allowable value or range of values for one or more or all items of acceptance criteria. For example, a user may specify that not only is a category required, but only emails having a particular value, or particular values, for the category are to be delivered. The user further may specify that only emails of the type request for information or automated form processing are to be delivered.

In another aspect, the acceptance criteria for a user can specify different acceptable values and/or different mandatory items of acceptance criteria for different groups of senders based upon groupings relating to security, employment position, employment role, or the like. In illustration, the acceptance criteria for user 120-1 may indicate that for senders with a first security rating or a first employment position, the email category must be specified. For senders with a second security rating or a second employment position, not only is a category required, but the email must have an email category of "X," else the email is not to be delivered.

In some cases, the items of acceptance criteria are standardized. For example, a template can be made available as an organization-wide template that is used by all users. If permissible, users can modify the template. For example, users can add additional items of acceptance criteria, designated such items as mandatory or not, and indicate allowable acceptance criteria values. In the event that a user does not wish to enforce an item of acceptance criteria, the user can edit or modify his or her profile so that each item is not mandatory and any acceptance criterion value can be received for the item of acceptance criteria (including no acceptance criteria value). A profile for which no acceptance criteria values are mandatory and any acceptance criteria value is acceptable would pass email from any sender regardless of whether the sender specified acceptance criteria values and, as such, operate as conventional email.

Continuing with FIG. 1, responsive to receiving the acceptance criteria for user 120-1, client system 115 can display the acceptance criteria upon a display device of client system 115 so that user 115-1 is able to view the items of acceptance criteria. User 115-1 can provide one or more acceptance criteria values to various items of acceptance criteria through client system 115. For example, client system 115 can present a user interface (UI) indicating each item of acceptance criteria with UI elements allowing user 115-1 to select or enter acceptance criteria values for each item of acceptance criteria.

Any acceptance criteria values input into client system 115 by user 115-1 in response to presented acceptance criteria are provided to email server 105. The acceptance criteria values specified by user 115-1 can be provided either with email 135 or separately. Email server 105 performs a negotiation between the acceptance criteria values provided from client system 115 and the acceptance criteria for the recipient of email 135, i.e., user 120-1. In general, email server 105 performs a comparison between the acceptance criteria values and the acceptance criteria. Email 135 is delivered to client system 120 only responsive to a determination by email server 105 that the acceptance criteria values are compliant with the acceptance criteria as described in further detail within this specification.

In the event that the acceptance criteria values provided by client system 115 do not comply with the acceptance criteria for user 120-1, email 135 is rejected. In that case, email server 105 provides an indication 140 to client system 115. Indication 140 indicates that email 135 has been rejected, i.e., not delivered to user 120-1. Indication 140 further can include a reason for non-compliance, e.g. the reason for rejection. In one example, indication 140 of the rejection of email 135 is a returned version of email 135. In another example, the indication of rejection is a message describing or indicating that email 135 was not delivered. In still another example, email server 105 places email 135 on a list of rejected emails that is provided to client system 115. In any case, when rejected, email 135 is not delivered or otherwise sent to client system 120.

As noted, indication 140 can include the reason for non-compliance and, accordingly, for rejection of email 135. The reason for non-compliance indicates why email 135 was rejected. Upon receiving indication 140, user 115-1 is able to update or modify one or more acceptance criteria values based upon the reason for non-compliance. For example, the reason for non-compliance can indicate that a particular item of acceptance criteria, for which user 115-1 provided no acceptance criteria value, is mandatory. In another example, the reason for non-compliance can indicate that a particular item of acceptance criteria requires a value within an enumerated range and the acceptance criteria value provided by user 115-1 was not in the enumerated range. In any case, user 115-1 can update any of the acceptance criteria values and send the email to email server 105 again. The described negotiation process performed by email server 105 is performed again or anew using the updated or modified acceptance criteria values.

In another example, where each of users 120-1, 125-1, and 130-1 is a recipient of email 135, email server 105 aggregates the acceptance criteria across all recipients of email 135. The aggregated acceptance criteria are provided to client system 115 so that user 115-1 may respond with acceptance criteria values for the various items of acceptance criteria for each of users 120-1, 125-1, and 130-1. In one aspect, the aggregated acceptance criteria is presented through a display device of client system 115 without indicating any association between individual items of the acceptance criteria and the particular user to which each individual item of acceptance criteria corresponds. In another aspect, however, each item of acceptance criteria is displayed in a manner that indicates the particular user to which that item of acceptance criteria corresponds.

Once acceptance criteria values are received from user 115-1 for email 135, email server 105 performs the negotiation for delivery. In doing so, a negotiation is performed for each of users 120-1, 125-1, and 130-1. Email server 105, for example, compares the acceptance criteria values specified by user 115-1 with the acceptance criteria for each of users 120-1, 125-1, and 130-1 independently. Thus, depending upon the acceptance criteria value(s) specified by user 115-1, email 135 may be delivered to each of users 120-1, 125-1, and 130-1; to one or more, but not all, of users 120-1, 125-1, and 130-1; or to none of users 120-1, 125-1, and 130-1.

Figure 2:
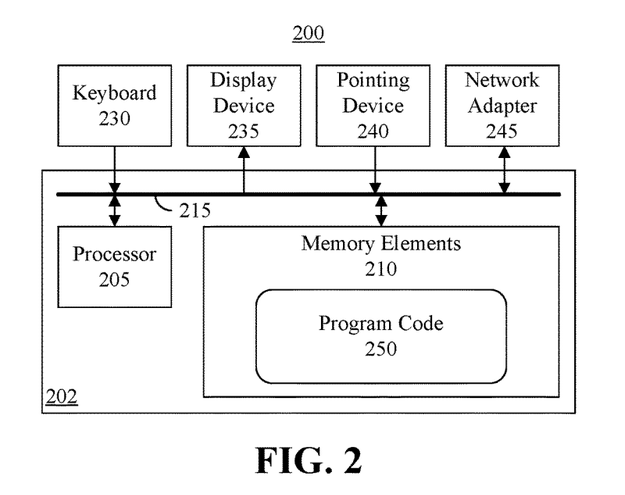
FIG. 2 is a block diagram illustrating an example of a data processing system.

FIG. 2 is a block diagram illustrating an example of a data processing system (system) 200. System 200 illustrates an exemplary implementation and/or architecture for client systems 115, 120, 125, and 135 and/or email server 105 of FIG. 1. As pictured, system 200 can include at least one processor 205, e.g., a central processing unit, coupled to memory elements 210 through a system bus 215 or other suitable circuitry. System 200 can store program code within memory elements 210. Processor 205 executes the program code accessed from memory elements 210 via system bus 215 or the other suitable circuitry.

In one aspect, system 200 is implemented as a computer or other programmable data processing apparatus that is suitable for storing and/or executing program code. It should be appreciated, however, that system 200 can be implemented in the form of any system including a processor and memory that is capable of performing and/or initiating the functions and/or operations described within this specification.

Memory elements 210 include one or more physical memory devices such as, for example, local memory and one or more bulk storage devices. Local memory refers to RAM or other non-persistent memory device(s) generally used during actual execution of the program code. A bulk storage device can be implemented as a hard disk drive (HDD), solid state drive (SSD), or other persistent data storage device. System 200 also can include one or more cache memories (not shown) that provide temporary storage of at least some program code in order to reduce the number of times program code must be retrieved from a bulk storage device during execution.

Input/output (I/O) devices such as a keyboard 230, a display device 235, and a pointing device 240 optionally can be coupled to system 200. The I/O devices can be coupled to system 200 either directly or through intervening I/O controllers. One or more network adapters 245 also can be coupled to system 200 to enable system 200 to become coupled to other systems, computer systems, remote printers, and/or remote storage devices through intervening private or public networks. Modems, cable modems, wireless transceivers, and Ethernet cards are examples of different types of network adapters 245 that can be used with system 200.

System 200 can be implemented in any of a variety of different form factors. As a server, for example, system 200 may or may not include I/O devices such as keyboard 230, display 235, and/or pointing device 240. As a client system, system 200 can be implemented as a personal computer, a portable computer, e.g., a laptop, a tablet, a mobile communication device, or the like. For example, system 200 can include I/O devices such as keyboard 230, display device 235, and pointing device 240 in any of a variety of different configurations, e.g., as an integrated display device in the form of a flat panel display or touchscreen that replaces keyboard 230 and/or pointing device 240, etc.

As pictured in FIG. 2, memory elements 210 can store program code 250. Program code 250 can include an operating system and appropriate application software. In the case of email server 105, for example, program code 250 represents a server operating system and email processing software that, when executed, performs the various server-side operations described within this specification. In the case of a client system, program code 250 represents an operating system and email client software that, when executed, performs the various client-side operations described within this specification. It should be appreciated that program code 250, including any parameters and/or attributes utilized by program code 250, e.g., acceptance criteria and acceptance criteria values, are functional data structures that impart functionality when employed as part of system 200.

Figure 3:
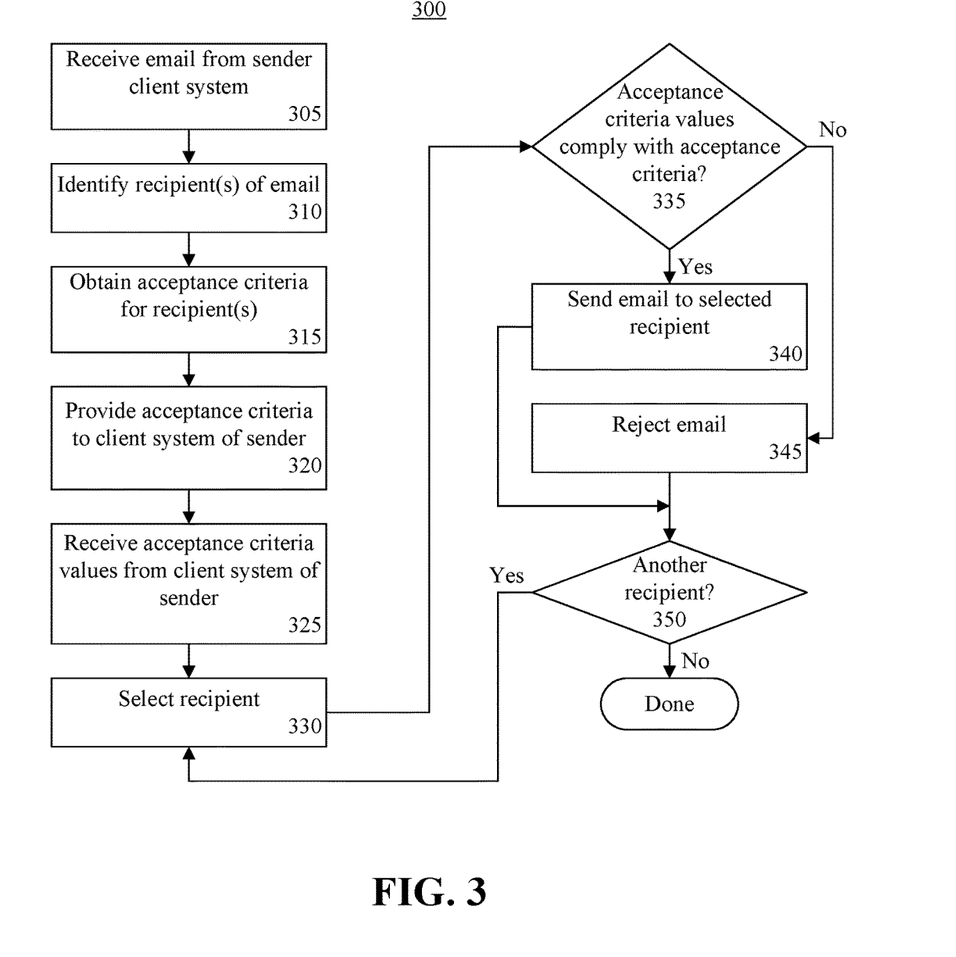
FIG. 3 is a flow chart illustrating an exemplary method of processing email.

FIG. 3 is a flow chart illustrating an exemplary method 300 of processing email. In general, FIG. 3 provides a method of operation for email server 105 of FIG. 1. Method 300 can begin in a state where acceptance criteria for one or more recipients are stored within, or are available to, the email server.

In block 305, the email server receives an email from a sender client system. In block 310, the email server identifies each recipient of the email received from the sender client system. In one example, a recipient is each user listed in the "To" field of the email. In another example, recipients of the email include each user listed in the "To" field and each user listed in the "CC" or "Carbon Copy" field of the email. In still another example, a recipient is each user listed in the "To" field, each user listed in the "CC" field, and each user listed in the "BC" or "Blind Copy" field of the email.

In block 315, the email server obtains acceptance criteria for each recipient identified in the email. When the email has only one recipient, the acceptance criteria requires no aggregation. The acceptance criteria used for determining whether to deliver the email to the recipient are the acceptance criteria for the single recipient. When the email has two or more recipients, however, the acceptance criteria for each of the recipients are aggregated. More particularly, the email server takes a union of the acceptance criteria for each recipient. The aggregated acceptance criteria become the acceptance criteria used to determine whether to deliver the email to the recipients. At this point, the email is not delivered to any recipient. Rather, the email is held by the email server while the email server awaits acceptance criteria values for the email from the sender client system.

In block 320, the email server provides the acceptance criteria to the sender's client system. In one aspect, for example, the email server sends items of acceptance criteria in order to query the sender for acceptance criteria values. The items of acceptance criteria can be displayed through a display device of the sender client system. The sender can provide one or more user inputs each specifying one or more acceptance criteria values through a suitable UI displayed by the display device of the sender client system.

For example, responsive to the sender selecting a send option for the email, the client system can present a UI through which the sender can specify one or more acceptance criteria values. The transactions between the sender client system and the email server relating to obtaining the acceptance criteria can be handled in the background so that the UI asking the user for acceptance criteria values, as presented by the display device of the sender client system, appears to occur in real time. As used herein, the phrase "real time" means a level of processing responsiveness that a user or system senses as sufficiently immediate for a particular process or determination to be made, or that enables the processor to keep up with some external process.

It should be appreciated that while FIG. 3 illustrates one particular interaction between the sender client system and the email server, the manner of interaction between the sender client system and the email server can vary. For example, in another aspect, responsive to the sender selecting a "send email" option or control, the sender client system can query the email server for acceptance criteria for each sender of the email without sending the email to the email server. Responsive to the query, the email server can obtain the acceptance criteria as described and send the acceptance criteria to the sender client system prior to the sender client system. Upon the sender specifying any acceptance criteria values, the sender client system can send the acceptance criteria values and the email. The email can be sent together with the acceptance criteria values, e.g., as a single unified communication, or the acceptance criteria values can be sent separately, or independently, of the email. Thus, while the email is shown to be received by the email server in a separate block than the acceptance criteria values, this need not be the case.

In querying the sender for acceptance criteria values through the UI, the sender can be presented with one or more UI elements that allow the user to enter a value or values for one or more items of acceptance criteria for the recipient. For example, the UI can include a drop down type of selection list with entries allowing the sender to select a particular type for the email, e.g., FYI, information request, etc. A similar UI element can be displayed allowing the user to select a particular category of the email. In some cases, the available options can be specified by the organization wide template. In other cases, the list of available options may be a subset of the organization wide template options as narrowed for, or by, the recipient. Any of a variety of different UI elements and/or styles can be used to query the sender for acceptance criteria values. While the sender may be queried for values through the UI, the UI may not inform the sender of which items of acceptance criteria are mandatory or the particular acceptance criteria values that will result in delivery of the email to the intended recipient(s).

In another example, a UI can be presented to the sender that provides the acceptance criteria of an intended recipient of an email. The UI can ask the sender to complete the acceptance criteria presented by the UI by providing the acceptance criteria value(s) as input. For example, a user may indicate that a type is required for an email to be accepted. Further, the user may specify the actual list of types from which the sender may choose within the UI, e.g., request for information, automated form processing, work assignment, FYI, calendar invite, or the like. In another example, a user may require that when the type is a request for information, a work assignment, or other type that requires action on the part of the user (recipient), that a due date is required. The sender can select any date or a limited number of dates in the future.

Continuing with FIG. 3, in block 325, the email server receives the acceptance criteria values from the sender client system. In block 330, the email server selects a recipient of the email for processing. In block 335, the email server determines whether the acceptance criteria values comply with the acceptance criteria obtained in block 325. The email server compares the acceptance criteria values with the acceptance criteria for the selected recipient. In this manner, the email server compares the acceptance criteria values from the sender with the acceptance criteria for each recipient individually. As such, the determination of whether to send the email to each of a plurality of recipients is performed on a recipient-by-recipient basis as opposed to making one determination for the entire group of recipients.

In illustration, the email server checks, for the selected recipient, whether an acceptance criteria value is specified for each item of acceptance criteria that is designated by the selected recipient as mandatory. If an acceptance criterion value is not specified for a mandatory item of acceptance criteria, the email is not sent or delivered to the selected recipient. In that case, the negotiation is said to fail as one or more acceptance criteria values are non-compliant with the acceptance criteria. Similarly, if an item of acceptance criteria indicates a range or limited set of acceptable values for the selected recipient and the acceptance criteria value does not fall with the enumerated range or is not an enumerated value, the acceptance criterion value is non-compliant and the email is not sent or delivered to the selected recipient.

Accordingly, only when an acceptance criterion value is specified for each mandatory item of acceptance criteria and each acceptance criterion value is found to be permissible with the corresponding item of acceptance criteria are the acceptance criteria value(s) determined to be compliant with the acceptance criteria for the selected recipient. In that case, method 300 continues to block 340, where the email is sent, or delivered, to the selected recipient for which the acceptance criteria values were found to be compliant with the acceptance criteria.

When one or more acceptance criteria values are found to be non-compliant with one or more of the corresponding items of acceptance criteria, method 300 continues to block 345, where the email is rejected by the email server. Rejecting the email means that the email is not delivered to the selected recipient. The email server provides the sender client system with a notification of the rejection for the selected recipient. As noted, the notification can include sending the rejected email back to the sending client system, providing a message indicating the rejection, providing a reason for non-compliance, and/or any combination thereof. In another example, the email server places an entry in a returned, or rejected, email list that is displayed within a UI of the sender client system.

In block 350, the email server determines whether there are any other recipients for the email that require processing. If so, method 300 loops back to block 330 to select a next recipient. If not, method 300 can end.

Figure 4:
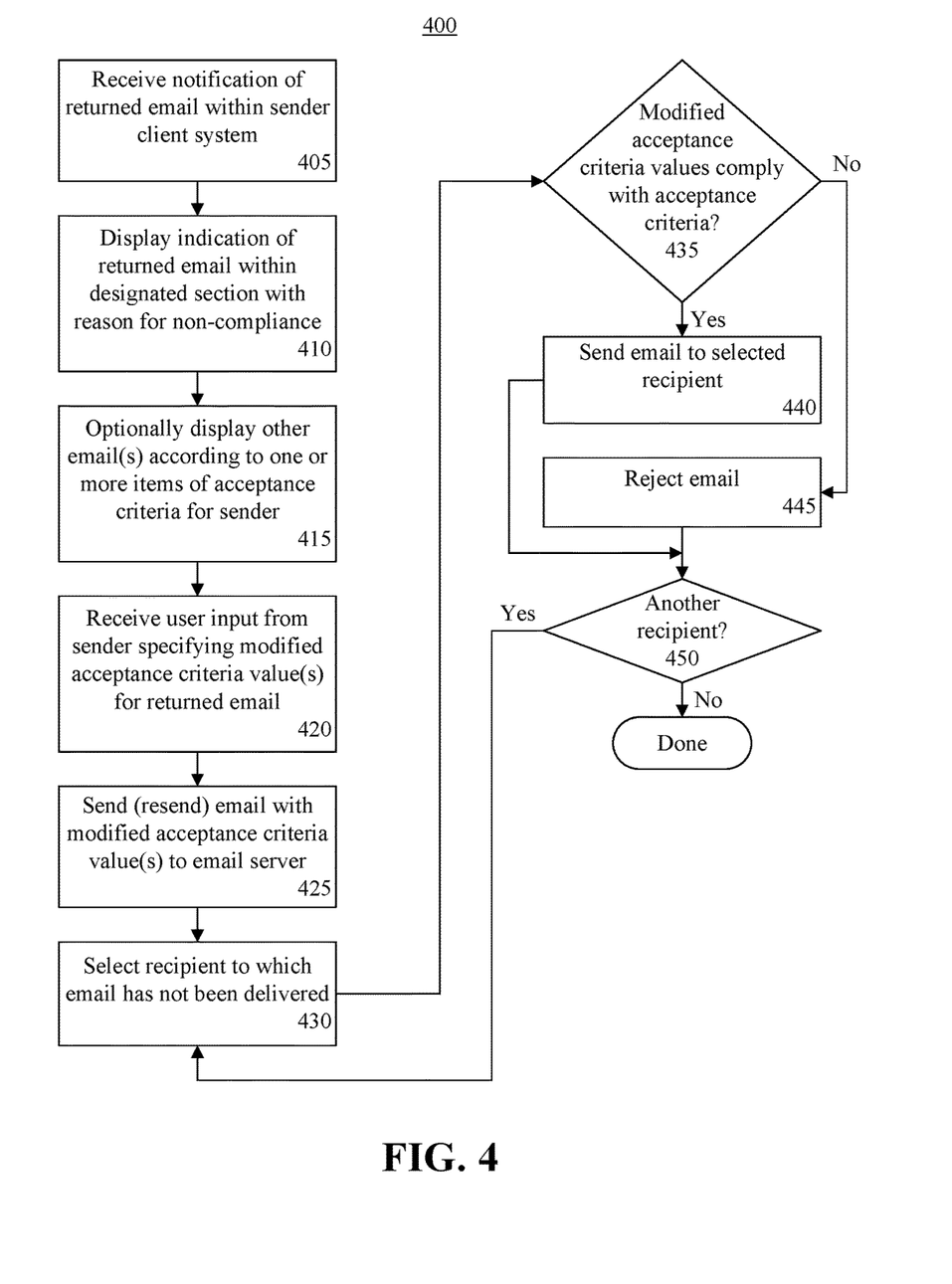
FIG. 4 is a flow chart illustrating another exemplary method of processing email.

FIG. 4 is a flow chart illustrating another exemplary method 400 of processing email. In general, FIG. 4 provides a method of operation for sender client system 115 as described with reference to FIG. 1. One or more features illustrated in FIG. 4, however, are performed by email server 105 of FIG. 1. Method 400 can begin in a state where the email server has determined that one or more acceptance criteria values provided by the sender for an email are non-compliant with acceptance criteria for a recipient of the email. As such, the email server does not deliver the email to the recipient of the email, or at least one of the recipients of the email.

In block 405, the sender client system receives a notification of the rejected email. The notification indicates that the email has not been delivered to at least one recipient specified for the email. Further, the notification indicates a reason that the email was rejected, i.e., not delivered. The reason for rejection, also referred to as the reason for non-compliance, specifies at least one acceptance criteria value that was non-compliant with an item of acceptance criteria as defined by the recipient to which the email was not delivered.

In block 410, the sender client system and, more particularly, a display device of the sender client system, displays an indication of the rejected email. The indication can be displayed within a designated, e.g., a dedicated, section of a UI that lists rejected emails. The indication can include the reason for non-compliance, e.g., at least one acceptance criteria value that did not comply with the corresponding item of acceptance criteria for the recipient.

In block 415, one or more other emails can be displayed by the sender's client system according to an item of acceptance criteria and corresponding acceptance criteria value as defined by the sender. For example, email received by the sender and/or sent by the sender can be displayed according to message type, category, due date, or the like.

In block 420, the sender client system receives a user input that specifies one or more modified acceptance criteria values for the rejected email. For example, the sender can provide a modified or updated acceptance criteria value that attempts to changes the particular acceptance criteria value(s) cited as the reason for non-compliance and the rejection of the email. In block 425, the client system can resend the previously rejected email to the email server with acceptance criteria value(s). The acceptance criteria value(s) include the updated or modified acceptance criteria value(s) (hereafter "modified acceptance criteria values").

Blocks 430-450 illustrate operations performed by the email server responsive to receiving the email and the modified acceptance criteria values. In block 430, the email server selects a recipient to which the email has not already been delivered. In block 435, the email server determines whether the modified acceptance criteria values comply with the acceptance criteria of the selected recipient. If so, method 400 continues to block 440, where the email server sends the email to the selected recipient. If not, method 400 proceeds to block 445, where the email server rejects the email as previously described.

In block 450, the email server determines whether the email specifies any other recipients to which the email has not been sent. If so, method 400 loop back to block 430 to select one of the recipients. If not, method 400 can end. Accordingly, as illustrated with reference to FIG. 4, the sender is able to specify modified acceptance criteria value(s) for rejected emails. The email server, having received the modified acceptance criteria value(s) can perform the negotiation process anew to determine whether to deliver the email to the intended recipient(s) to which delivery earlier failed.

FIGS. 3 and 4 describe various embodiments in which the sender of an email is presumed to be a human being. In other cases, however, users receive auto-generated email. An auto-generated email refers to one that is automatically generated by a computer system, one if returned is returned to an email account designed to only send email and not receive, an email account not associated with a human being, or the like. Examples of auto-generated email include a corporate email, an organization wide email, an email notification from a Website, e.g., a blog to which a user has subscribed, a feed, a feed notification, or the like. In cases where an auto-generated email is received, alternate processing can be applied.

In one aspect, for example, the email can be associated with or include a pre-determined acceptance criteria value or values. The template previously described, for example, can specify acceptance criteria values that are to be applied automatically to auto-generated email by the sending system so that such emails can be appropriately processed by the email server. The acceptance criteria for any user of the organization would specify how to process auto-generated emails including, for example, where or how to display such email.

In another aspect, auto-generated emails can be tagged by the sending system with one or more identifying or special tags. Again, the acceptance criteria for the user can indicate how the email server is to process any email with such a tag indicating that the email is auto-generated. In still another example, the acceptance criteria can indicate that emails from a particular email address, domain, or the like are not to undergo the negotiation process within the email server. In that case, the email server would send such emails automatically to the recipients. Auto-generated emails can be identified as described, whether through application of acceptance criteria values, tags, or from other identifying attributes, and displayed in one or more particular or designated sections of the UI of the recipient client system.

Figure 5:
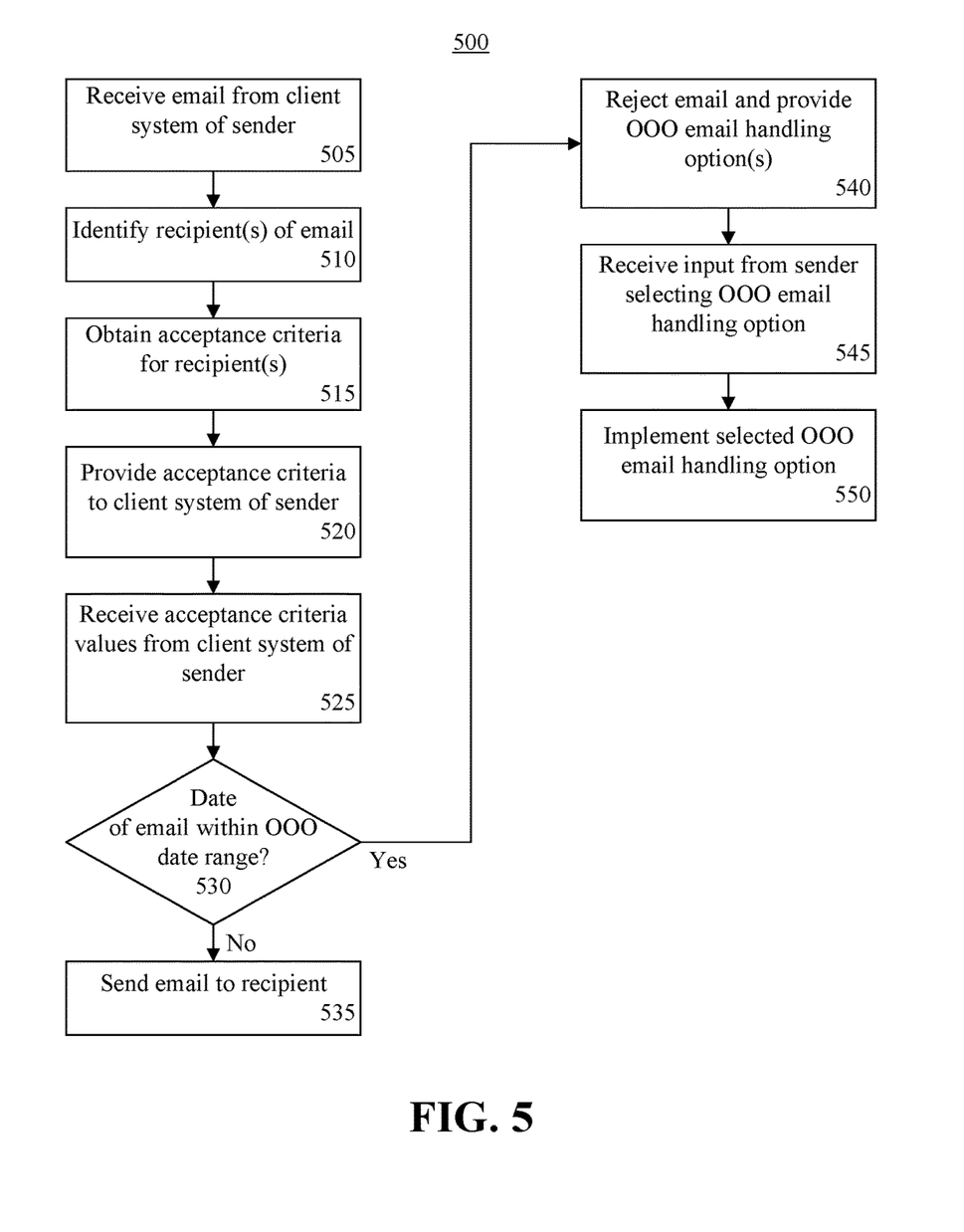
FIG. 5 is a flow chart illustrating another exemplary method of processing email.

FIG. 5 is a flow chart illustrating another exemplary method 500 of processing email. In general, FIG. 5 provides a method of operation for email server 105 of FIG. 1. More particularly, FIG. 5 illustrates one example of out-of-office (OOO) email handling. Method 500 can begin in a state where acceptance criteria for a recipient are stored within, or are available to, the email server.

In block 505, the email server receives an email from a sender client system. In block 510, the email server identifies each recipient of the email received from the sender client system. In block 515, the email server obtains acceptance criteria for each recipient identified in the email.

In block 520, the email server provides the acceptance criteria to the sender client system. The sender can provide one or more user inputs through a suitable UI displayed by a display device of the sender client system. Each user input can specify one or more acceptance criteria values. In block 525, the email server receives the acceptance criteria values from the sender client system. As noted, the interactions between the sender client system and the email server with regard to obtaining the acceptance criteria for the recipient can vary as previously described.

In block 530, the email server determines whether the acceptance criteria values comply with the acceptance criteria obtained in block 525. In the case of OOO email handling, for example, the acceptance criteria indicates that he or she will be out of the office for a particular date range. Accordingly, the email server determines whether the date of the email is within the date range during which the recipient is out of the office.

Further, the acceptance criteria for the recipient can specify one or more delegates that are available to handle various matters for the duration of the date range while the recipient is out of the office. In one aspect, a different delegate, or group of two or more delegates, can be specified for various combinations of acceptance criteria values. For example, emails sent in the date range relating to "X" category are associated with "delegate A," while emails sent in the date range for "Y" category are associated with "delegate B."

When the date of the email is not within the date range, method 500 continues to block 535. In block 535, the email can be sent to the recipient. Block 535 presumes that any other acceptance criteria values are compliant with the acceptance criteria for the recipient. When the date of the email is within the date range, method 500 proceeds to block 540. In block 540, the email server rejects the email. In rejecting the email, the email server sends an indication of the rejection. In this example, the indication of rejection can include a message indicating rejection of the email to the recipient, the returned email, and a reason for non-compliance. In addition, the indication can include one or more OOO email handling options.

Responsive to receiving the indication including the OOO email handling option(s), the sender client system queries the sender, via a UI, to select an OOO email handling option for the rejected email. One example of an OOO email handling option is forwarding the email to one or more of the delegates. More particularly, the sender is advised that the recipient is out of the office and given the opportunity to have the email sent or forwarded to one or more of the delegates. As noted, the particular delegate to which the email may be forwarded can be determined or selected from a group of delegates for the intended recipient based upon the acceptance criteria specified by the recipient and the acceptance criteria values provided by the sender. Other examples of OOO email handling options include, but are not limited to, automatically having the email sent, or resent, when the recipient is back in the office, e.g., after the ending date of the data range, or cancelling the sending of the email entirely.

In block 545, the email server receives a selected OOO email handling option from the sender client system. The email server further can receive the email to which the selected OOO email handling option is to be applied, e.g., the previously rejected or returned email. In block 550, the email server implements the selected OOO email handling option.

In another exemplary implementation, the sender of the email can be informed by the acceptance criteria that the recipient is out of the office. For example, in block 520, the acceptance criteria for the recipient, as displayed by the sender client system, can indicate the date range the recipient is out of the office. Further, the sender can be presented with the OOO email handling options at that time, e.g., when presented with the acceptance criteria for the recipient. In such an implementation, the email can be processed by the email server in accordance with the selected OOO email handling option without first returning the email to the sender client system or otherwise rejection the email.

FIG. 6 is a block diagram illustrating an exemplary UI 600 displayed by a client system of a user. UI 600 can be presented via a sender client system and/or a recipient client system. In one aspect, UI 600 can be displayed as a replacement for an inbox view of an email client executing within a client system. Though described as a potential "inbox" replacement, UI 600 can include, or display, emails that have been sent by a user in addition to emails that have been received by the user.

As pictured, UI 600 includes a plurality of different areas or sections designated as sections 605, 620, 625, 630, 635, and 640. Section 605 includes a sub-section 610 and a sub-section 615. In general, each of sections 605, 620, 625, and 630 correspond to email type. More particularly, for a given user, each different type of email that can be received, as defined by the acceptance criteria for the user, is provided its own section.

As discussed, different types of email indicate the action that is to be performed. Accordingly, emails received by the user to which UI 600 corresponds that are designated as requests for information are displayed in section 605, emails designated as assignments are displayed in section 620, emails that have been rejected (e.g., not delivered to at least one of the intended recipients) are displayed in section 625, and emails designated as for your information are displayed in section 630. Emails are displayed in the appropriate section of UI 600 by the client system according to the sender specified acceptance criteria value for "type," which can be provided to the client system with the delivery of the email. Alternatively, for emails that are sent and displayed in UI 600, the client system will have received user input specifying the acceptance criteria value(s) that can be maintained and used to display the email, or a reference thereto, in the appropriate section.

In section 605, for example, emails can be organized according to whether the user has requested information or the user is being requested to provide information. For example, sub-section 610 includes requests for information emails received by the user from other users. The email requests for information can be presented as a list within section 610. The emails in section 610 require a response. A due date in the form of a "desired response" date and/or time is specified as an acceptance criteria value and displayed within sub-section 610. The emails presented in section 610, e.g., as a list, can be sorted according to any of the headers shown. Sub-section 615 includes emails that have been received from others in answer to an email designated as a request for information sent by the user. The emails of section 615 can be presented as a list that can be sorted according to any of the headers shown. In this example, the email thread for the request for information is tracked with the replies to requests for information being displayed in dedicated sections, or sub-sections, of UI 600.

Section 625 includes any emails rejected to the user due to a negotiation failure, e.g., non-compliance of acceptance criteria value(s) compared with acceptance criteria. In one example, section 625 displays a list that includes only entries that reference rejected emails. The list can be sorted according to any of the headers shown. Section 625 also can include emails returned for other reasons such as an incorrect email address, an attachment being too large, or the like. In the case where the email is returned due to non-compliance, the user can select an email and correct the reason for return. For example, the user can select the email directed to "User 8." Responsive to the user selection, a UI can be displayed through which the user can change an acceptance criterion value. In this example, the user can add a categorization to the email directed to "User 8." The email then can be resent or submitted to the email server with the modified acceptance criteria values. In the case of the email directed to "User 7," responsive to selection of that email the user can be presented with the OOO email handling options previously described. The selected OOO email handling option can be sent from the user client system to the email server with the email.

UI 600 also can include a calendar section 635 allowing the user to view emails according to a selected date or date range, etc. UI 600 further can include a hierarchical folder view section 640 allowing the user to select particular folders for which email can be displayed.

Though not illustrated, UI 600 can include one or more other sections reserved for particular auto-generated email. Each section can be reserved for displaying particular ones of auto-generated emails based upon acceptance criteria values associated with the auto-generated email, tags, or other identifying attributes as previously described.

This specification discloses various techniques for processing email. In accordance with the inventive arrangements disclosed herein, email can be organized and displayed within a client system according to various acceptance criteria. Email delivery to recipients can be negotiated in accordance with recipient specified acceptance criteria and sender specified acceptance criteria values. In the event that email is rejected, e.g., not delivered, the sender can be provided with the opportunity to modify one or more acceptance criteria values so that delivery of the email is re-negotiated in accordance with the modified acceptance criteria value(s). Further, OOO email handling is provided that reduces the amount of outdated email delivered to users that are out of the office.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A computer-implemented method performed within an electronic mail server, comprising:
   receiving, by the electronic mail server, an electronic mail from a sender client system;
   identifying, by the electronic mail server and from a recipient field in the electronic mail, a recipient of the electronic mail;
   electronically sending, responsive to receiving the electronic mail and to the sender client system, a query configured to cause a graphical user interface of the sender client system to display via the graphical user interface one or more user interface elements that are configured to receive, from the user, an entry of acceptance criteria values;
   storing within the electronic mail server and not delivering the electronic mail to the recipient until the acceptance criteria values are electronically received;
   electronically receiving, from the graphical user interface of the sender client system and in response to the query, the acceptance criteria values;
   performing a determination, by the electronic mail server and based upon the acceptance criteria values, whether to:
      send the electronic mail to the recipient or
      reject the electronic mail;
   holding within the electronic mail server and not delivering the electronic mail to the recipient based upon the determination; and
   sending, based upon the determination and to the sender client system, an electronic message indicating non-delivery of the electronic mail to the recipient, wherein
   the determination is based upon the acceptance criteria values being non-compliant with acceptance criteria previously electronically provided by the recipient, and
   the graphical user interface of the sender client includes a returned-mail section, and the returned-mail section is configured, in response to receiving the electronic message indicating non-deliver of the electronic mail to the recipient, to display:
      an identification of the recipient,
      an identification the electronic mail, and
      an indication as to why the electronic mail was not delivered.

2. The method of claim 1, further comprising:
   receiving, from the sender client system, a modified acceptance criteria value; and
   sending the electronic mail to the recipient responsive to a different determination that the modified acceptance criteria values comply with the acceptance criteria.

3. The method of claim 1, further comprising:
   identifying acceptance criteria for each of a plurality of recipients of the electronic mail, wherein the query is based upon a union of acceptance criteria for the plurality of recipients.

4. The method of claim 1, wherein
   the acceptance criteria comprise a date range during which the recipient is out of the office and a delegate for the recipient.

5. The method of claim 4, wherein
   the sending the electronic message includes providing, to the sender client system, an out of office electronic mail handling option for the rejected electronic mail.

6. The method of claim 5, wherein
   the out of office electronic mail handling option schedules the electronic mail to be sent to the recipient after an ending date of the date range.

7. The method of claim 5, wherein
   the out of office electronic mail handling option cancels sending of the electronic mail.

8. An electronic mail server, comprising:
   a hardware processor programmed to initiate the following executable operations:
      receiving, by the electronic mail server, an electronic mail from a sender client system;
      identifying, by the electronic mail server and from a recipient field in the electronic mail, a recipient of the electronic mail;
      electronically sending, responsive to receiving the electronic mail and to the sender client system, a query configured to cause a graphical user interface of the sender client system to display via the graphical user interface one or more user interface elements that are configured to receive, from the user, an entry of acceptance criteria values;
      storing within the electronic mail server and not delivering the electronic mail to the recipient until the acceptance criteria values are electronically received;
      electronically receiving, from the graphical user interface of the sender client system and in response to the query, the acceptance criteria values;
      performing a determination, by the electronic mail server and based upon the acceptance criteria values, whether to:
         send the electronic mail to the recipient or
         reject the electronic mail;
      holding within the electronic mail server and not delivering the electronic mail to the recipient based upon the determination; and
      sending, based upon the determination and to the sender client system, an electronic message indicating non-delivery of the electronic mail to the recipient, wherein
   the determination is based upon the acceptance criteria values being non-compliant with acceptance criteria previously electronically provided by the recipient, and
   the graphical user interface of the sender client includes a returned-mail section, and the returned-mail section is configured, in response to receiving the electronic message indicating non-deliver of the electronic mail to the recipient, to display:
      an identification of the recipient,
      an identification the electronic mail, and
      an indication as to why the electronic mail was not delivered.

9. The server of claim 8, wherein the hardware processor is further configured to initiate the following executable operations:
   receiving, from the sender client system, a modified acceptance criteria value; and
   sending the electronic mail to the recipient responsive to a different determination that the modified acceptance criteria values comply with the acceptance criteria.

10. The server of claim 8, wherein the hardware processor is further configured to initiate the following executable operations:
   identifying acceptance criteria for each of a plurality of recipients of the electronic mail, wherein the query is based upon a union of acceptance criteria for the plurality of recipients.

11. The server of claim 8, wherein
the acceptance criteria comprise a date range during which the recipient is out of the office and a delegate for the recipient.

12. The server of claim 11, wherein
the sending the electronic message includes providing, to the sender client system, an out of office electronic mail handling option for the rejected electronic mail.

13. The server of claim 12, wherein
the out of office electronic mail handling option schedules the electronic mail to be sent to the recipient after an ending date of the date range.

14. The server of claim 12, wherein
the out of office electronic mail handling option cancels sending of the electronic mail.

15. A computer program product, comprising
a computer readable storage medium having program code stored thereon,
the program code executable, which when executed by an electronic mail server, causes the electronic mail server to perform:
receiving, by the electronic mail server, an electronic mail from a sender client system;
identifying, by the electronic mail server and from a recipient field in the electronic mail, a recipient of the electronic mail;
electronically sending, responsive to receiving the electronic mail and to the sender client system, a query configured to cause a graphical user interface of the sender client system to display via the graphical user interface one or more user interface elements that are configured to receive, from the user, an entry of acceptance criteria values;
storing within the electronic mail server and not delivering the electronic mail to the recipient until the acceptance criteria values are electronically received;
electronically receiving, from the graphical user interface of the sender client system and in response to the query, the acceptance criteria values;
performing a determination, by the electronic mail server and based upon the acceptance criteria values, whether to:
send the electronic mail to the recipient or reject the electronic mail;
holding within the electronic mail server and not delivering the electronic mail to the recipient based upon the determination; and
sending, based upon the determination and to the sender client system, an electronic message indicating non-delivery of the electronic mail to the recipient, wherein
the determination is based upon the acceptance criteria values being non-compliant with acceptance criteria previously electronically provided by the recipient, and
the graphical user interface of the sender client includes a returned-mail section, and the returned-mail section is configured, in response to receiving the electronic message indicating non-deliver of the electronic mail to the recipient, to display:
an identification of the recipient,
an identification the electronic mail, and
an indication as to why the electronic mail was not delivered.

16. The computer program product of claim 15, wherein the program code executable further causes the electronic mail server to perform:
receiving, from the sender client system, a modified acceptance criteria value; and
sending the electronic mail to the recipient responsive to a different determination that the modified acceptance criteria values comply with the acceptance criteria.

17. The computer program product of claim 15, wherein the program code executable further causes the electronic mail server to perform:
identifying acceptance criteria for each of a plurality of recipients of the electronic mail, wherein the query is based upon a union of acceptance criteria for the plurality of recipients.

18. The computer program product of claim 15, wherein the acceptance criteria comprise a date range during which the recipient is out of the office and a delegate for the recipient.

19. The computer program product of claim 18, wherein the sending the electronic message includes providing, to the sender client system, an out of office electronic mail handling option for the rejected electronic mail.

20. The computer program product of claim 19, wherein the out of office electronic mail handling option schedules the electronic mail to be sent to the recipient after an ending date of the date range.

* * * * *